(12) United States Patent
Benevelli et al.

(10) Patent No.: US 11,359,350 B2
(45) Date of Patent: Jun. 14, 2022

(54) ARTICULATED WHEEL LOADER AND METHOD OF CONTROLLING THE STEERING OPERATIONS OF AN ARTICULATED WHEEL LOADER

(71) Applicant: CNH Industrial America LLC, New Holland, PA (US)

(72) Inventors: Alessandro Benevelli, Albinea (IT); Antonio Venezia, Turin (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/311,680

(22) PCT Filed: Dec. 4, 2019

(86) PCT No.: PCT/EP2019/083611
§ 371 (c)(1),
(2) Date: Jun. 7, 2021

(87) PCT Pub. No.: WO2020/115103
PCT Pub. Date: Jun. 11, 2020

(65) Prior Publication Data
US 2021/0355656 A1 Nov. 18, 2021

(30) Foreign Application Priority Data
Dec. 5, 2018 (IT) .................. IT102018000010840

(51) Int. Cl.
*E02F 9/20* (2006.01)
*B62D 12/02* (2006.01)
*E02F 9/08* (2006.01)

(52) U.S. Cl.
CPC ............ *E02F 9/2087* (2013.01); *B62D 12/02* (2013.01); *E02F 9/0841* (2013.01)

(58) Field of Classification Search
CPC ....... E02F 9/2087; E02F 9/0841; B62D 12/02
See application file for complete search history.

(56) References Cited

U.S. PATENT DOCUMENTS

| | | | |
|---|---|---|---|
| 2,833,557 A | 5/1958 | Palmiter | |
| 3,998,289 A * | 12/1976 | Maurer | B62D 7/04 180/6.64 |

(Continued)

FOREIGN PATENT DOCUMENTS

JP 2012086618 A 5/2012

OTHER PUBLICATIONS

International Search Report for PCT application PCT/EP2019/083611, dated Mar. 10, 2020 (11 pages).

(Continued)

*Primary Examiner* — Tyler J Lee
(74) *Attorney, Agent, or Firm* — Peter Zacharias; Patrick Sheldrake

(57) ABSTRACT

A method of steering an articulated wheel loader including a front body portion and a rear body portion, the front body portion including a bucket and a pair of front wheels. The rear body portion is pivotally coupled to the front body portion and includes a pair of rear wheels. The method includes steps of: providing a steering command to steer the wheel loader; detecting an angle that a front longitudinal axis of the front body portion forms with a rear longitudinal axis of the rear body portion; and when the detected angle is greater than a threshold automatically implementing a steering brake function to independently brake one of the pair of front wheels or rear wheels that is on a steering side to reduce a speed of the braked wheel to zero so that the braked wheel becomes a pivot point to minimize a turning radius.

10 Claims, 2 Drawing Sheets

(56) References Cited

U.S. PATENT DOCUMENTS

| | | | | |
|---|---|---|---|---|
| 4,502,709 | A * | 3/1985 | Schaeff | B66F 9/07554 |
| | | | | 280/758 |
| 5,102,202 | A * | 4/1992 | Breen | B60T 7/20 |
| | | | | 188/112 R |
| 5,535,124 | A * | 7/1996 | Hosseini | B60T 8/175 |
| | | | | 180/197 |
| RE36,152 | E * | 3/1999 | Hosseini | B60T 8/175 |
| | | | | 701/82 |
| 6,631,320 | B1 * | 10/2003 | Holt | E02F 9/0841 |
| | | | | 701/83 |
| 8,069,942 | B2 * | 12/2011 | Niva | A61P 35/00 |
| | | | | 180/235 |
| 8,640,811 | B2 * | 2/2014 | Ahl | B60K 23/0808 |
| | | | | 180/235 |
| 9,925,983 | B2 * | 3/2018 | Mitchell | E02F 9/0841 |
| 9,956,874 | B2 * | 5/2018 | Velde | B60K 17/354 |
| 10,939,605 | B2 * | 3/2021 | Matsuzaki | A01B 69/008 |

OTHER PUBLICATIONS

Italian Search Report for IT application 102018000010840 dated Aug. 28, 2019 (8 pages).

* cited by examiner

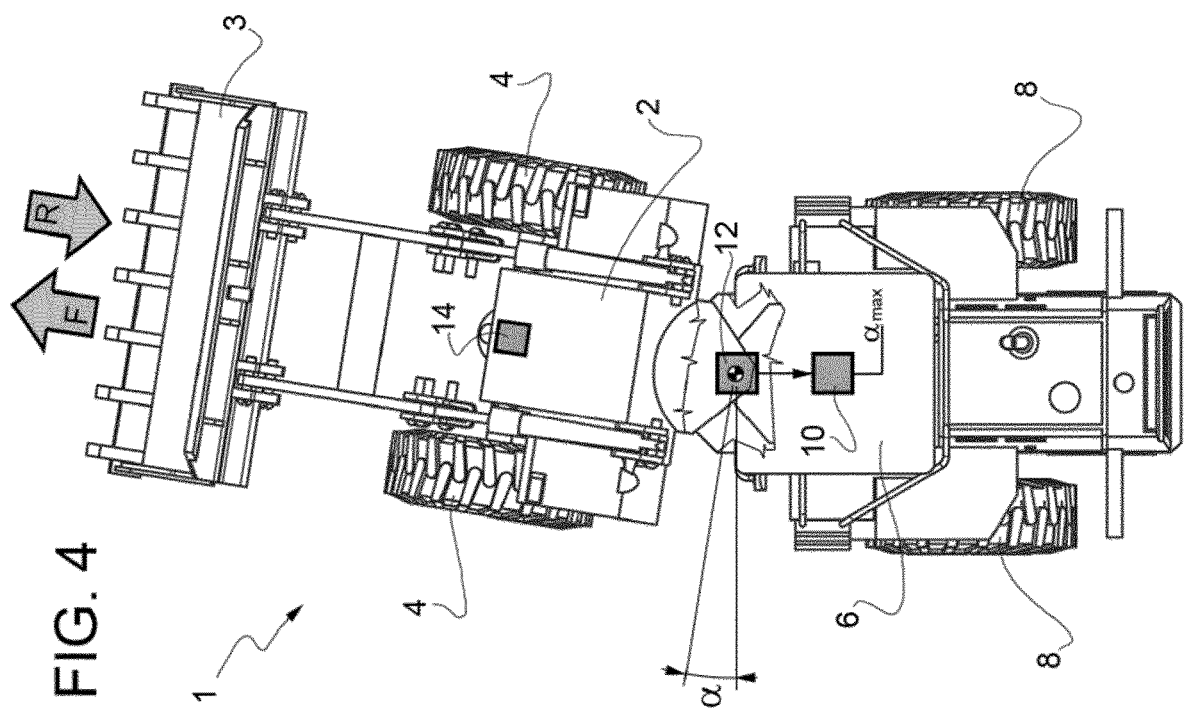
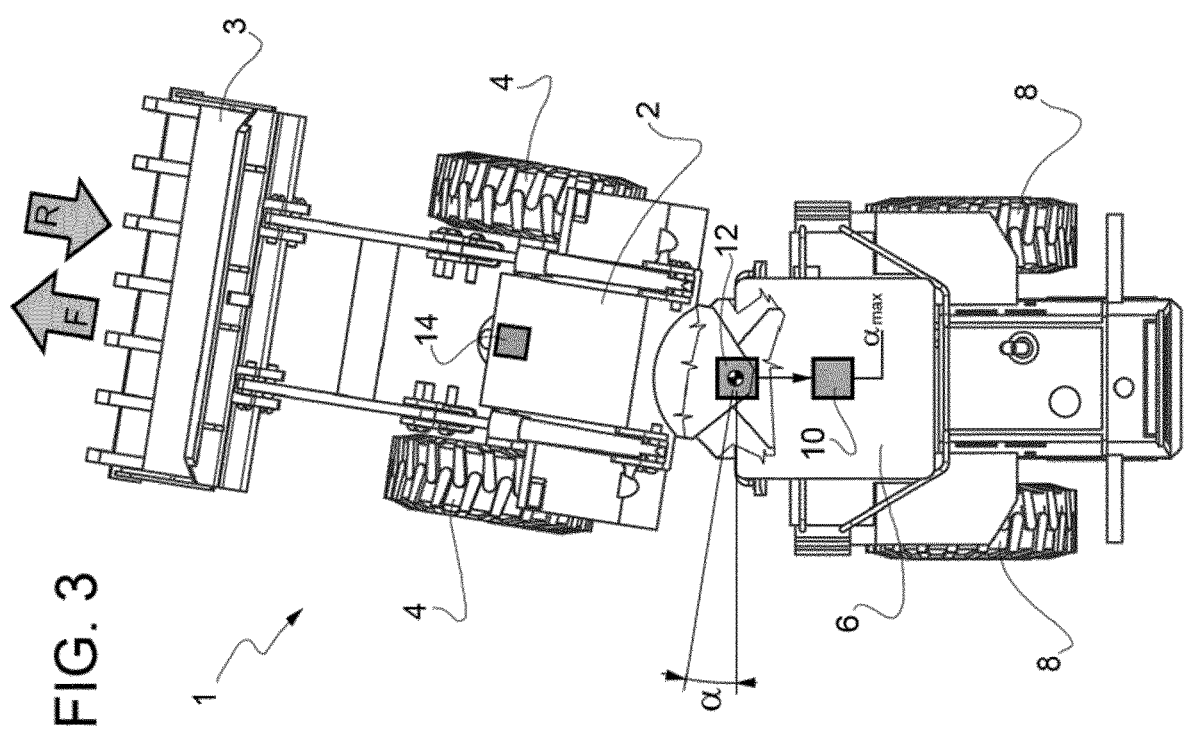

ARTICULATED WHEEL LOADER AND METHOD OF CONTROLLING THE STEERING OPERATIONS OF AN ARTICULATED WHEEL LOADER

TECHNICAL FIELD

The present invention relates to an articulated wheel loader and to a method of controlling the steering operations of an articulated wheel loader.

BACKGROUND OF THE INVENTION

A wheel loader is a heavy equipment vehicle used in construction to move aside or load materials into or onto another type of vehicle or machine (such as a dump truck, conveyor belt, feed-hopper, or railroad car). Examples of load materials are: asphalt, demolition debris, dirt, snow, sand, gravel, logs, raw minerals, recycled material, rocks, woodchips, etc.

Basically a wheel loader has a front body portion provided with a bucket to carry load material and having a couple of front wheels and a rear body portion connected in a pivoting manner with the with the front body portion and provided with a couple of rear wheels.

The present invention is focused in reducing the turning radius of the wheel loader when cornering. Reducing turning radius reduces the time for re-positioning of the wheel loader during normal uses and enhances productivity.

SUMMARY OF THE INVENTION

The above advantage is obtained by the present invention that relates to a method of controlling the steering operations of an articulated wheel loader having a front body portion provided with a bucket and having a couple of front wheels and a rear body portion connected in a pivoting manner with the with the front body portion and provided with a couple of rear wheels, the method comprising the steps of: providing a steering command to steer the wheel loader that proceeds in a forward direction or in a rear direction; detecting the angle ($\alpha$) that a front longitudinal axis of the front body portion forms with a rear longitudinal axis of the rear body portion; in the case that the measured angle ($\alpha$) is greater than a threshold ($\alpha_{MAX}$) automatically implementing a steering brake function wherein one wheel of the front body portion or of the rear body portion is independently braked to reduce its speed to zero so that the wheel becomes a pivot point during to cornering in order to minimize the turning radius.

The present invention also relates to an articulated wheel loader having a front body portion provided with a bucket and having a couple of front wheels and a rear body portion connected in a pivoting manner with the with the front body portion and provided with a couple of rear wheels, the wheel loader comprising: a control unit providing a steering command to steer the wheel loader that proceeds in a forward direction or in a rear direction; a sensor detecting the angle that a front longitudinal axis (Fa) of the front body portion forms with a rear longitudinal axis (Ra) of the rear body portion; the control unit, in the case that the measured angle ($\alpha$) is greater that a threshold ($\alpha_{MAX}$) is configured to automatically implement a steering brake function wherein one wheel of the front body portion or of the rear body portion that is on the steering side is independently braked to reduce its speed to zero so that the wheel becomes a pivot point during to cornering in order to minimize the turning radius.

BRIEF DESCRIPTION OF THE DRAWINGS

The invention shall be described in the accompanied drawings that represent a not-limiting example of the invention wherein;

FIGS. 3 and 4 shown an articulated wheel loader operating according to an embodiment of the present invention.

DETAILED DESCRIPTION OF THE INVENTION

Figure 2:
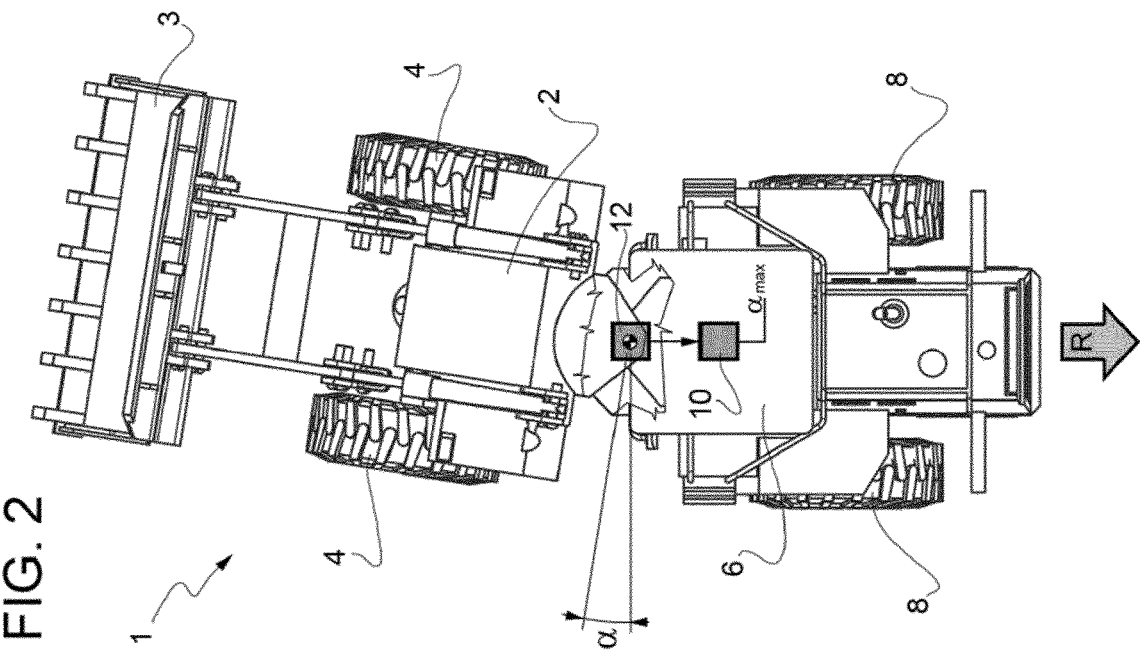
FIGS. 1 and 2 represent schematically an articulated wheel loader operating according to the present invention.

In the figures numeral 1 indicates an articulated wheel loader (of known kind) having a front body portion 2 provided with a bucket 3 and having a couple of front wheels 4 and a rear body portion 6 connected in a pivoting manner with the front body portion 2 and provided with a couple of rear wheels 8. Typically rear portion 6 houses the engine (not shown) and has a cabin (not shown) for the driver.

The wheel loader 1 comprises a control unit 10 that receives a driving request and provides a steering command to steer the wheel loader 1 when the wheel loader 1 proceeds in a forward direction F or in a rear direction R indicated by arrows. Steering operation is obtained according to known techniques.

According to the present invention a sensor 12 detects the angle $\alpha$ that a front longitudinal axis Fa of the front body 2 portion forms with a rear longitudinal axis Ra of the rear body portion 6. The signal outputted by the sensor 12 is provided to the control unit 10 that compares the measured angle $\alpha$ with a threshold $\alpha_{MAX}$ representing a maximum steering angle.

The control unit 10, in the case that the measured angle $\alpha$ is greater than the threshold $\alpha_{MAX}$, is configured to automatically implement a steering brake function wherein one wheel 4 or 8 of the front body portion 2 or of the rear body portion 6 that is on the steering side is independently braked to reduce its speed to zero so that the wheel becomes a pivot point during to cornering in order to minimize the turning radius. Each wheels 4, 8 may be independently braked using a respective Electro valve (not shown) of an electro hydraulic braking system (not shown of a known kind).

Figure 1:
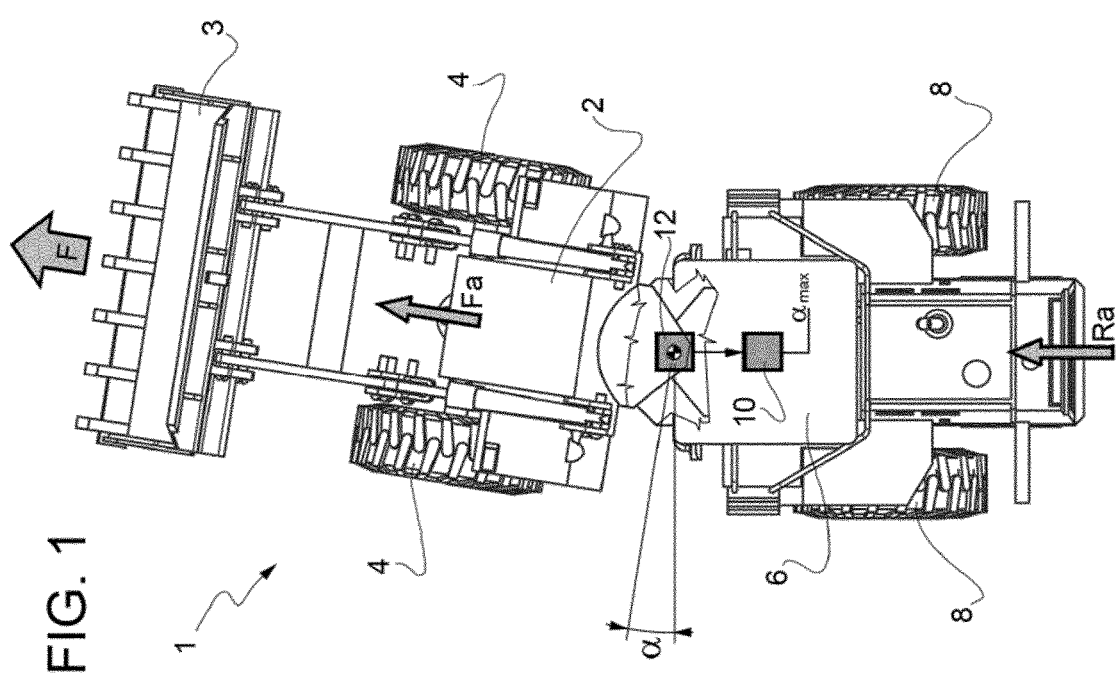

More specifically if the wheel loader 1 is proceeding forward and is left steering, the control unit 10 brakes the wheel on the left side while the wheel on the right side continues in rotating and if the wheel loader 1 is proceeding forward and is right steering (FIG. 1), the control unit 10 brakes the wheel on the right side while the wheel on the left side continues in rotating.

Conversely, if the wheel loader 1 is proceeding rear and is left steering, the control unit 10 brakes the wheel on the left side and if the wheel loader is proceeding rear and is right steering, the control unit 10 brakes the wheel on the right side.

FIGS. 3 and 4 show an alternative logic.

This logic uses a load sensor 14 provided to detect the presence of a load in the bucket 3 to discriminate between an unloaded condition (FIG. 4) and a loaded condition (FIG. 3) when the detected load is over a load limit.

The control unit 10 is configured—when the loaded condition is detected—to independently brake one wheel of the front body portion 2 if the wheel loader 1 is proceeding forward; if the wheel loader 1 is proceeding in a rear direction the control unit provides to independently brake one wheel 8 of the rear body portion 6.

Under the unloaded condition the steering brake function provides to independently brake one wheel of the rear body portion 6 if the wheel loader 1 is proceeding forward; if the wheel loader is proceeding in a rear direction the steering brake function provides to independently brake one wheel 4 of the front body portion 2.

The invention claimed is:

1. A method of controlling steering operations of an articulated wheel loader comprising a front body portion and a rear body portion, the front body portion comprising a bucket and a pair of front wheels, the rear body portion connected in a pivoting manner with the front body portion and comprising a pair of rear wheels, the method comprising steps of:
    providing a steering command to steer the wheel loader;
    detecting an angle that a front longitudinal axis of the front body portion forms with a rear longitudinal axis of the rear body portion; and
    when the detected angle is greater than a threshold automatically implementing a steering brake function to independently brake one of the pair of front wheels that is on a steering side or one of the pair of rear wheels that is on the steering side to reduce a speed of the braked wheel to zero so that the braked wheel becomes a pivot point to minimize a turning radius.

2. The method as claimed in claim 1, wherein the braked wheel is selected depending on a direction of the wheel loader, the direction being either a forward direction or a backward direction.

3. The method as claimed in claim 2, wherein:
    if the wheel loader is proceeding in the forward direction the steering brake function provides independently braking the one of the pair of front wheels that is on the steering side; and
    if the wheel loader is proceeding in the backward direction the steering brake function provides independently braking the one of the pair of rear wheels that is on the steering side.

4. The method as claimed in claim 1, further comprising steps of:
    detecting a load distribution comprising an unloaded condition wherein no load is present in the bucket and a loaded condition wherein a load is present in the bucket; and
    selecting the braked wheel based on the detected load distribution.

5. The method as claimed in claim 4, wherein:
    if the detected load distribution is the loaded condition, the steering brake function provides independently braking the one of the pair of front wheels if the wheel loader is proceeding in a forward direction; and independently braking the one of the pair of rear wheels if the wheel loader is proceeding in a backward direction; and
    if the detected load distribution is the unloaded condition, the steering brake function provides independently braking the one of the pair of rear wheels if the wheel loader is proceeding in the forward direction; and independently braking the one of the pair of front wheels if the wheel loader is proceeding in the backward direction.

6. An articulated wheel loader comprising a front body portion and a rear body portion, the front body portion comprising a bucket and a pair of front wheels, the rear body portion connected in a pivoting manner with the front body portion and comprising a pair of rear wheels, the wheel loader comprising:
    a control unit configured to provide a steering command to steer the wheel loader; and
    a sensor detecting an angle that a front longitudinal axis of the front body portion forms with a rear longitudinal axis of the rear body portion,
    wherein the control unit is further configured to, when the detected angle is greater that a threshold, automatically implement a steering brake function to independently brake one of the pair of front wheels that is on a steering side or one of the pair of rear wheels that is on the steering side to reduce a speed of the braked wheel to zero so that the braked wheel becomes a pivot point to minimize a turning radius.

7. The articulated wheel loader as claimed in claim 6, wherein the control unit is further configured to select the braked wheel depending on a direction of travel of the wheel loader, the direction being either a forward direction or a backward direction.

8. The articulated wheel loader as claimed in claim 7, wherein:
    if the wheel loader is proceeding in the forward direction the steering brake function provides independently braking the one of the pair of front wheels that is on the steering side; and
    if the wheel loader is proceeding in the rear direction the steering brake function provides independently braking the one of the pair of rear wheels that is on the steering side.

9. The articulated wheel loader as claimed in claim 6, wherein the control unit is further configured to:
    detect, by a load sensor, a load distribution comprising an unloaded condition wherein no load is present in the bucket and a loaded condition wherein a load is present in the bucket; and
    select the braked wheel based on the detected load distribution.

10. The articulated wheel loader as claimed in claim 9, wherein:
    if the detected load distribution is the loaded condition, the steering brake function provides independently braking the one of the pair of front wheels if the wheel loader is proceeding in a forward direction; and independently braking the one of the pair of rear wheels if the wheel loader is proceeding in a backward direction; and
    if the detected load distribution is the unloaded condition, the steering brake function provides independently braking the one of the pair of rear wheels if the wheel loader is proceeding in the forward direction; and independently braking the one of the pair of front wheels if the wheel loader is proceeding in the backward direction.

* * * * *